May 18, 1954   J. H. REISNER   2,678,581
SIGNAL COMPARISON APPARATUS
Filed Nov. 30, 1949
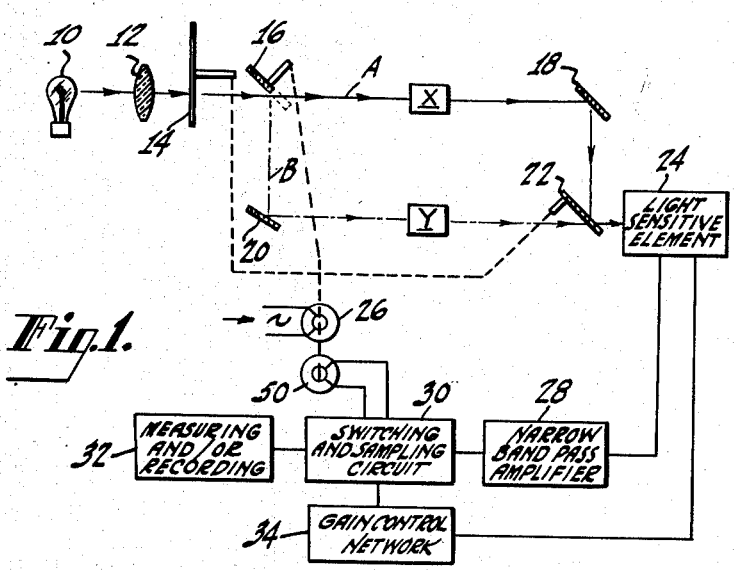
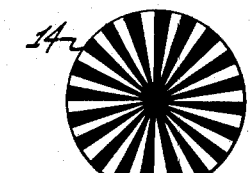
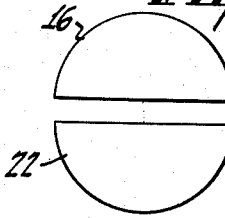
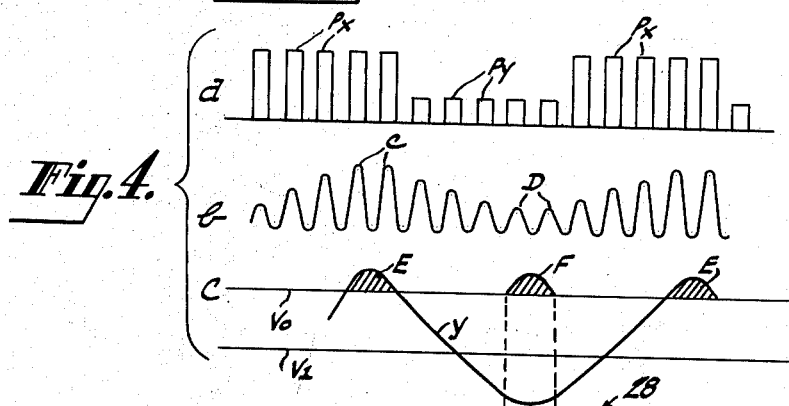
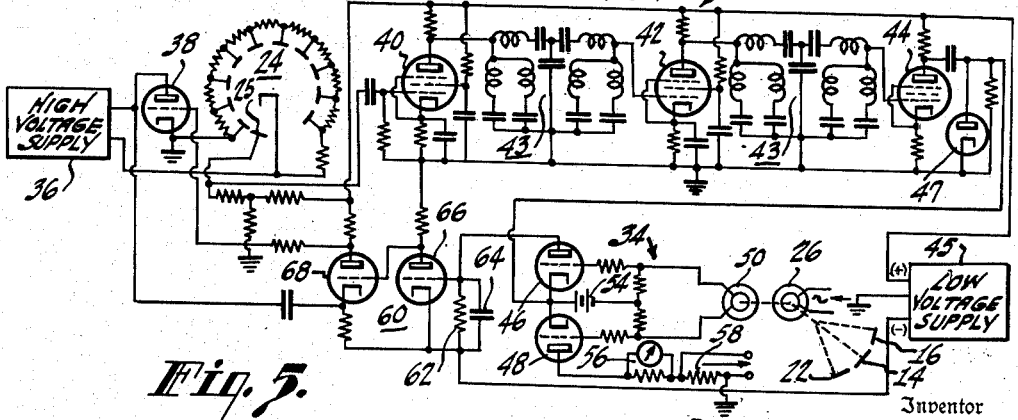
Inventor
JOHN H. REISNER
By
Morris␣␣␣␣␣␣
Attorney Patented May 18, 1954

2,678,581

UNITED STATES PATENT OFFICE 2,678,581

SIGNAL COMPARISON APPARATUS

John H. Reisner, Haddonfield, N. J., assignor to Radio Corporation of America, a corporation of Delaware Application November 30, 1949, Serial No. 130,139

3 Claims. (Cl. 88—14)

This invention relates to improvements in signal comparison apparatus, and while not limited thereto, finds particular application in apparatus for photometric comparison of light values.

It has previously been proposed to make photometric comparison of light values by alternately directing two beams of light onto a light-sensitive element, amplifying the resultant electrical pulses generated in the light-sensitive element, and using the electrical pulses derived from one of the beams as a means of controlling the response of the system to the second of the beams, so that a measurement of the current generated by the second beam actually will be a measurement of the ratio between the light in the two beams (see e. g. U. S. Patents 2,474,098—Dimmick, 2,442,910—Thomson).

In general, the sensitivity of such a system is limited by the thermal noise generated in the light sensitive photocell or photomultiplier. On the other hand, the bandwidth requirements of the amplifying system for minimum noise are opposed to the bandwidth requirements for accurately reproducing the alternate pulses passing through the amplifier. Consequently, in prior art apparatus of this type, it has been necessary to effect a compromise in the amplifier bandwidth, and this compromise often results in an unsatisfactory sensitivity characteristic.

A further objection to prior art devices resides in the fact that the light sensitive element must be shielded rather carefully from unwanted light sources to obtain suitable results.

It is, accordingly, a principal object of the present invention to provide an improved signal comparison apparatus.

Another object of the invention is to provide an improved apparatus for comparing light values.

Another object of the invention is to increase the sensitivity of a light value comparator.

In accordance with the invention, the foregoing and other related objects and advantages are attained by generating the signals to be compared in alternate pulse groups, and applying these pulse groups sequentially to the measuring apparatus. As will be shown, this permits the use of a very narrow bandwidth amplifier without introducing interference between the two signals, and also helps to eliminate the effect of light from undesired sources thereby appreciably improving the effective sensitivity of the system.

A more complete understanding of the invention can be had from the following description of an illustrative embodiment thereof, when considered in connection with the accompanying drawing wherein:

Fig. 1 is a diagram of an apparatus for comparing light values in accordance with the invention, Figs. 2 and 3 are plan views of rotary elements suitable for use in the apparatus of Fig. 1, Fig. 4 is a series of graphs illustrating certain of the principles of the invention, and Fig. 5 is a diagram of an electrical circuit suitable for use in the apparatus of Fig. 1.

As was previously mentioned, the sensitivity of a signal comparison apparatus generally is limited by the thermal noise occurring in the input elements of the apparatus, and the noise currents appearing in the output are a function of the overall frequency bandwidth of the system (in the case of a photocell, for example, see Journal of the Optical Association of America, volume 37, page 420). Consequently, for maximum sensitivity (i. e. maximum signal-to-noise ratio), it is important to limit the bandwidth of the apparatus as much as possible.

However, in a signal comparison apparatus wherein the signals to be compared pass through an amplifier as alternate pulses, as in the above-mentioned patents, a fairly wide band amplifier is required in order that each pulse can pass through the amplifier and be completely cleared before the succeeding pulse starts. As the frequency pass band of the amplifier is decreased, a point soon is reached at which sequential pulses interfere, and the operation becomes faulty. In general, it can be stated that such a condition will occur if the rate of beam switching is of the same order of magnitude as the pulse repetition frequency.

A system for obviating this difficulty in accordance with the present invention is shown partially in schematic and partially in block diagram form in Figure 1.

Referring particularly to Figure 1, the system shown comprises a photometric light comparator including a light source 10 adapted to project a light beam through a collimating lens 12 along either of two paths A, B in an optical system. The beam of light from the light source 10 is interrupted or "pulsed" at some predetermined frequency, $f_0$, by a motor driven shutter 14. A rotating sectored mirror 16 either deflects the light pulses along the path B, or allows the light pulses to follow the path A, depending on the rotational position of the mirror 16 at any given instant. Two fixed mirrors 18, 20 direct the light pulses in paths A, B toward a second rotating sectored mirror 22 which is operated in conjunction with the sectored mirror 16 to direct light pulses toward a light sensitive element 24. Samples X, Y having different light transmission characteristics can be compared by insertion thereof in the light paths, as shown. For the sake of concreteness, it will be assumed hereinafter that the sample X in the path A is a standard sample with which the sample Y is to be compared, and pulses derived from light pulses following path A will be referred to as the "standard" pulses, while pulses derived from light pulses following path B will be referred to as the "unknown" pulses. If spectral characteristics are of interest, monochromators or similar wave length selecting devices can be inserted in the system ahead of the mirror 16 or after the mirror 22. Also, it is apparent that other physical characteristics of the samples X, Y, such as reflectance characteristics, can be compared by suitable location of the samples in the paths A, B.

It is evident that the light pulse repetition rate $f_0$ will be dependent on the angular velocity and the configuration of the shutter 14, while the beam switching rate $f_1$ will be dependent on the angular velocity and configuration of the sectored mirrors 16, 22. In accordance with the invention, the pulse repetition rate $f_0$ is made substantially greater than the beam switching rate $f_1$, say in the ratio of 10 to 1. While this result can be reached in any one of a number of different ways, a simple expedient is to provide the shutter 14 with twenty open sectors, as shown in Fig. 2, and to make the mirrors 16, 22 complementary half round sectors, as shown in Fig. 3. The three rotating members 14, 16, 22 are driven by a common motor 26 so that they will have the same angular velocity and suitable fixed phase relation. Obviously, the members 14, 16, 22 could be driven by separate suitably phased synchronous motors.

The light pulses received by the element 24 are converted therein into electrical pulses, and the latter preferably are applied to a narrow band pass amplifier 28 which is sharply tuned to the frequency $f_0$ corresponding to the pulse repetition rate of the light pulses. This, of course, gives the desired result of decreasing the bandwidth of the apparatus in order to decrease noise and increase the sensitivity.

As was previously stated, the pulses reaching the amplifier 28 will occur in discrete groups of ten, and the amplitude of the pulses in each group will depend on the transmission characteristics of the light paths through which the light pulses have passed. This is illustrated in Figure 4a, which shows three complete groups of electrical pulses derived from light pulses travelling through the two paths A, B in Figure 1. To conserve space, only five pulses are shown in each group. The pulses $P_x$ in Fig. 4a are assumed to be the standard signal pulses derived from light pulses following path A, and the pulses $P_y$ are assumed to be the unknown pulses derived from light following the path B.

When evenly spaced rectangular pulses of the type shown in Figure 4a pass through a narrow bandwidth amplifier at a repetition rate corresponding to the mid-frequency of the amplifier pass band, the output of the amplifier will have an approximately sinusoidal wave form of a frequency corresponding to that of the incoming pulses. When a transition occurs from pulses of one amplitude to pulses of another amplitude, the envelope of the sine wave must build up or decay, as the case may be, until a steady state condition has been reached. This is illustrated in Figure 4b, wherein there is shown the sinusoidal amplifier output corresponding to the input pulses shown in Figure 4a.

From Figure 4b, it can be seen that the amplitude of the amplifier output wave actually will be proportional to the amplitude of the applied signals only after sufficient time has elapsed for the output wave to build up or decay to a stable value, as, for example, at points C and D in Figure 4b.

Figure 4b also will serve to illustrate overlap or interference between sequential pulses in a narrow bandwidth amplifying system. If, for example, the beam switching rate $f_1$ were equal to the pulse repetition rate $f_0$ in the system being described, each pulse passing through the amplifier would differ in amplitude from the preceding and succeeding pulse in the same manner that the pulse group amplitude vary in Fig. 4a. Under such conditions, the amplifier output would stay at some relatively constant value intermediate between the values of the two input signals. This, of course, would provide no differentiation between the two signals at the amplifier output. However, by providing signal groups as shown in Fig. 4a, and sampling the output of the amplifier at the end of the build up and decay intervals, as at C and D in Figure 4b, the two signals passing through the amplifier can be detected in their correct relative amplitude relation.

To this end, the output of the amplifier 28 is applied to a switching and sampling circuit 30 in which two electrical paths are provided for the amplifier output, with the rate of switching between the two electrical paths being synchronized with the rate of switching between the two beam paths, and with each electrical path in the circuit 30 being conductive only for alternate brief time intervals during which the amplifier output signal is at a steady state maximum or minimum value.

From the switching circuit 30, a voltage representing the intensity of the light pulses in one of the beams is applied to a measuring and/or recording device 32, while a voltage corresponding to the pulses in the other light beam is applied to a control network 34 to control the sensitivity of the system. Where the light sensitive element 24 is of the photomultiplier type, the control network 34 preferably is connected to regulate the operating voltage applied to the element 24, as shown. However, it will be understood that the control network 34 can be connected to control gain at any desired point in the apparatus, as for example, in the manner shown in the above-mentioned Thomson patent.

Thus, in the system of Figure 1, it is evident that the advantages inherent in narrow bandpass amplification are made available without involving interference or overlap between the two signals, and without resorting to the use of separate amplifiers for the two signals. Also, signals developed from extraneous light striking the element 24 will produce little or no output from the amplifier, and, hence, need not be shielded out other than to prevent over-actuation of the element 24.

In Figure 5, there is shown a diagram of an electrical circuit embodying the principles described in connection with Figure 1.

Referring particularly to Figure 5, a light sensitive element 24 is shown as a photomultiplier tube connected to receive dynode voltage from a high voltage supply source 36 through a variable impedance voltage regulator, such as a vacuum tube 38. The output anode 25 of the photomultiplier 24 is connected to a narrow band amplifying system 28 comprising three amplifying tubes 40, 42, 44, having interstage band-pass coupling circuits 43 tuned to a frequency $f_0$. The amplifying system 28 is energized from a low voltage supply source 45, and the output of the last amplifier tube 44 is coupled to the cathodes of a pair of switching tubes 46, 48, in a switching and sampling circuit 34. A damping diode 47 connected across the output of the last amplifier tube 44 helps to establish the proper voltage reference level for the negative signal pulses applied to the switch tube cathodes by "clipping" the positive portion of pulses from the amplifier.

As was previously explained, light pulses reaching the photomultiplier tube 24 from one of the beam paths, A, in Figure 1 are to be used to control the gain of the system by controlling the dynode voltage of the multiplier tube, while the light pulses from the other beam path, B, are to be measured for comparison with those from the first path A. To this end, the grids of the switch tubes 46, 48 are connected in 180° out-of-phase relation to an alternating voltage generator 50 which is mechanically coupled to operate in synchronism with the driving motor 26 for the shutter 14 and the two sectored mirrors 16, 22, so that the tubes 46, 48 each will pass pulses from the amplifier 28 during alternate half cycles of voltage from the generator 50. A battery 54 or equivalent is connected to bias the switch tubes 46, 48 in a manner to be described. The anode of one of the switch tubes, 48, is connected to ground through a metering network 56 and an output resistor 58, from which output voltages can be applied to a recorder or the like, while the other switch tube, 46, is connected to a two-stage direct coupled amplifier 60.

A resistor 62 and a capacitor 64 are connected in parallel between the grid and the cathode of the first tube 66 in the amplifier 60, and the time constant of the resistor-capacitor combination 62, 64 is made much greater than one-half the period of the alternating voltage from the generator 50, so that any pulse passing through the switch tube 46 will develop a charge on the capacitor 64 which will be maintained until the next pulse passes through the switch tube 46.

The voltage on the capacitor 64, as determined in the foregoing manner, regulates the output voltage of the amplifier 60 in accordance with standard signals derived from light pulses passing along path A in Fig. 1. The regulated output voltage of the amplifier 60 controls the bias on the regulator tube 38 for the photomultiplier 24, thus controlling the gain of the apparatus in accordance with the standard signals.

As was stated, the output of the amplifier 28 will not give a true representation of the input pulses supplied thereto until sufficient time has elapsed for the output to build up or decay to its steady state value. Consequently, the two switch tubes 46, 48 are biased to respond only during a small portion of any pulse group period. This is illustrated in Figure 4c, wherein the line $V_0$ represents the cut-off voltage for the switch tubes, the line $Vl$ represents the bias voltage applied by the battery 54 to the switch tube grids, and the line Y represents the output voltage of the generator 50. The shaded portions E of the line Y represent intervals during which the grid of the tube 46 is above cut-off, while the shaded portion F, transposed from the alternate half cycle of the generator output, represents the interval during which the grid of the tube 48 will be above cut-off. From Figure 4c, it can be seen that the voltage on the switch tube grids will go above cut-off only during a limited portion of each half cycle of the switching intervals. Consequently, the switch tubes 46, 48 will pass pulses only when the amplifier output has reached a steady state value, and the switch tube outputs will be truly representative of the amplifier input signals. It is, of course, a simple matter to adjust the phase of the generator output voltage so that the peaks in each half cycle thereof will occur near the end of the switching intervals, as shown in Figure 4c.

While the invention has been described with particular reference to a light value comparator, it is evident that the same principles are applicable to any system for determining the comparative effects of two specimens on a beam of energy, such as in X-ray penetration comparators and the like, by a simple substitution of suitable energy source and energy converter. Thermocouple elements or bolometers may be used as detectors in infra-red applications. Since many such changes could be made in the apparatus described, all within the scope and spirit of the invention, the foregoing is to be construed as illustrative, and not in a limiting sense.

What is claimed is:

1. An apparatus for comparing light values received from two samples to be compared, said apparatus comprising a source of light, means to derive from said source a pulsating beam of light, means to project said beam upon said samples alternately at a rate lower than the rate of pulsation of said beam whereby to modify said pulses in alternate groups in accordance with a physical characteristic of said samples, an electric circuit including a light sensitive element arranged to be actuated by modified light pulses received from said samples to generate groups of electrical pulses proportional in amplitude to the amplitudes of said modified light pulses, an amplifier in said circuit for amplifying said electrical pulses, said amplifier including a coupling circuit having a narrow frequency pass band with a center frequency equal to the pulse repetition rate of said electrical pulses, means to derive from selected portions of said electrical pulse groups two separate voltages proportional in magnitude to the amplitude of the amplified pulses in alternate ones of said groups, a response control circuit for controlling the response of said electric circuit to said pulses in accordance with one of said voltages during derivation of the other of said voltages, and means to measure said other voltage as a measure of the comprative magnitudes of said modified pulses.

2. Apparatus as defined in claim 1 wherein said light sensitive element comprises a photomultiplier tube, and wherein said response control circuit comprises a source of voltage for said tube and means to regulate the voltage applied to said tube from said source in accordance with said one separate voltage.

3. Apparatus as defined in claim 1 wherein said separate voltage deriving means includes an electronic switching circuit connected to said amplifier and having two circuit sections alternately rendered conductive for a brief interval during the alternate projection of said beam upon said samples.

References Cited in the file of this patent

UNITED STATES PATENTS

| Number | Name | Date |
|---|---|---|
| 1,816,047 | Keuffel | July 28, 1931 |
| 1,932,337 | Dowling | Oct. 24, 1933 |
| 2,412,423 | Rajchman et al. | Dec. 10, 1946 |
| 2,431,510 | Salinger | Nov. 25, 1947 |
| 2,434,497 | Kearsley | Jan. 13, 1948 |
| 2,442,298 | Liston | May 25, 1948 |
| 2,442,910 | Thomson | June 8, 1948 |
| 2,471,249 | Stearns et al. | May 24, 1949 |
| 2,474,098 | Dimmick | June 21, 1949 |
| 2,492,901 | Sweet | Dec. 27, 1949 |